US 7,546,005 B2

(12) United States Patent
Ishizaka

(10) Patent No.: US 7,546,005 B2
(45) Date of Patent: Jun. 9, 2009

(54) OPTICAL SWITCH AND PATH SWITCHING METHOD

(75) Inventor: Masashige Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/718,580

(22) PCT Filed: Oct. 25, 2005

(86) PCT No.: PCT/JP2005/019530

§ 371 (c)(1), (2), (4) Date: May 3, 2007

(87) PCT Pub. No.: WO2006/049031

PCT Pub. Date: May 11, 2006

(65) Prior Publication Data

US 2008/0031568 A1    Feb. 7, 2008

(30) Foreign Application Priority Data

Nov. 4, 2004    (JP) .............................. 2004-320559

(51) Int. Cl.
G02B 6/26    (2006.01)
G02F 1/295    (2006.01)
(52) U.S. Cl. .................... 385/17; 385/4; 385/8; 385/16
(58) Field of Classification Search .................. None
See application file for complete search history.

(56) References Cited

U.S. PATENT DOCUMENTS 5,546,483 A * 8/1996 Inoue et al. .................... 385/14
6,259,833 B1 * 7/2001 Doerr et al. .................... 385/17
6,859,574 B2 * 2/2005 Doerr et al. .................... 385/17
2003/0235362 A1   12/2003 Sugama et al.
2004/0071390 A1 * 4/2004 Horst .......................... 385/17

FOREIGN PATENT DOCUMENTS

| EP | 1 146 386 A1 | 10/2001 |
| JP | 5-273604 A | 10/1993 |
| JP | 11-212123 A | 8/1999 |
| JP | 2000-241836 A | 9/2000 |
| JP | 2002-72157 A | 3/2002 |
| JP | 2003-202606 A | 7/2003 |

* cited by examiner

Primary Examiner—Sung H Pak
Assistant Examiner—Mike Stahl
(74) Attorney, Agent, or Firm—Sughrue Mion, PLLC

(57) ABSTRACT

An optical switch not having waveguide crossings, as in a matrix switch, enabling input/output path switching of N×N, and not increasing the optical loss or the size when the number of channels increases. The optical switch includes plural input ports 10 and plural output ports 17 and has a path switching function of the planar waveguide type. The input ports are connected to one ends of respective different sub-slab optical waveguides 12. The opposite side ends of the sub-slab optical waveguides 12 are optically coupled to one end of a common main slab optical waveguide 15 via arrayed optical waveguides 14. To the opposite side end of the main slab optical waveguide 15 are connected plural output ports 17. On the top of the arrayed optical waveguides 14, there are respectively arranged electrodes 13, each causing the difference in the refractive index of the respective optical waveguide.

17 Claims, 4 Drawing Sheets

OPTICAL SWITCH AND PATH SWITCHING METHOD

TECHNICAL FIELD

This invention relates to an integrated spatial optical switch for switching multi-input multi-output optical paths, such as is used for optical communication, optical exchange, optical information processing and optical interconnections.

BACKGROUND ART

In the field of optical information processing, as well as in optical communication, the need for developing an optical switching technique which effects direct path switching of a large amount optical signal information, in an optical signal, without transforming the optical signal to the corresponding electrical signal, is increasing. A large variety of techniques, ranging from an assembly of a planar optical waveguide on a substrate of e.g. quartz glass, semiconductor, lithium niobate or a polymer, up to a switch of a large scale having a movable unit of an extremely small size, such as a micro-machine, has so far been devised.

The switch including a micro-machine has a movable part and hence is complex to manufacture. It also suffers the problem that it is not that easy to procure operational reliability, and that it is difficult to increase the switching speed.

Another example of the optical switch, implemented by a planar optical circuit, is a multi-input and multi-output optical switch composed of a plural number of one-input two-output units and a plural number of two-input two-output units, as basic units, arranged in a matrix configuration. Taking an example of a four-input four-output matrix optical switch, eight 1×2 switch units and four 2×2 switch units are needed. In this case, switching of optical paths in the respective switch units is by exploiting changes in the refractive index brought about by the thermo-optical effect or the electro-optical effect.

However, with this system, if the switch is increased in size and the number of channels is increased, the overall size of the device is increased, while the number of crossings of the waveguides is also increased. Consequently, there are raised a number of problems, such as increase in optical loss and in the device cost, and lowered yield.

Recently, such a system is being researched, in which the refractive index of an arrayed optical waveguide is varied to deflect the propagated light beam to perform switching of the optical path.

FIG. 4 shows a known configuration of an arrayed optical waveguide type switch (see Patent publication 1). In this known configuration, the arrayed optical waveguide type switch is formed as a planar optical circuit on a quartz substrate 71. In an arrayed optical waveguide section, the respective optical waveguides are set to equal lengths. A preset difference may be caused in the refractive indexes of the optical waveguides by applying a voltage to heater electrodes 76 differing in length from one waveguide to another.

A signal light, entered an input optical waveguide 74, is spread laterally by a first slab optical waveguide 75 so as to be distributed to the arrayed optical waveguide 77.

When the voltage, applied to the heater electrodes 76, is changed, preset changes in the refractive indexes are produced from one optical waveguide of the arrayed optical waveguide 77 to the next. The propagation direction of the light beam is deflected at input ends 79 of a second slab optical waveguide 72. This causes the light collecting point at output ends 78 of the second slab optical waveguide 72 to be changed to alter the output optical waveguide (output port) 73 for signal light.

The configuration of FIG. 4 has a merit that it is not increased excessively in size as a result of crossings of waveguides or of an increased number of channels as in the case of the above-described matrix switch. However, the configuration has a drawback that, while it allows for the one-input multiple-output function, it does not allow for the multiple-input multiple-output function.

Patent Document 2 discloses an optical switch which implements an N×N switch by interconnecting plural input ports and plural output ports by a two-dimensional light beam propagated on a slab optical waveguide. Patent Document 3 discloses an optical switch comprising a first optical deflector, a planar optical waveguide, and a second optical deflector. The first optical deflector includes a star coupler, a set of waveguide arrays and electrodes, sequentially connected to input ports, while the second optical deflector includes a star coupler, a set of waveguide arrays and electrodes, sequentially connected to output ports. The two array sets are interconnected via a planar waveguide. The waveguide light beams of an array of the first optical deflector are phase controlled by electrodes so that the light beams are caused to be incident on a desired array of the second light deflector. The waveguide light beams propagated on the array of the second optical deflector are phase controlled by electrodes to provide for the equal phase of the light beams which are then incident on the coupler. The coupler then radiates only light incident thereon in the equal phase state.

Patent Document 1: JP Patent Kokai Publication No. JP-A-11-212123 (FIG. 1)

Patent Document 2: JP Patent Kokai Publication No. JP-P2003-202606A (FIG. 9)

Patent Document 3: JP Patent Kokai Publication No. JP-A-5-273604 (FIG. 1)

DISCLOSURE OF THE INVENTION

Problems to be Solved by the Invention

In the field of optical information processing as well as in the field of communication, not only the input/output switching functions for 1×N switching but also those for N×N switching are required of the optical switches in these years.

In the spatial deflection switch of the above-mentioned arrayed optical waveguide type, there is generated no waveguide crossing as in the case of a matrix switch, while size increase caused by the increase in the number of channels is relatively benign. Thus, the switch may be expected to come into use in future. However, it suffers the problem that it is not capable of N×N input/output switching.

In view of the above depicted problems of the related art, it is a principal object of the present invention to provide an optical switch in which, even if the number of channels is increased, optical loss and increase in size may be suppressed, and in which the switch allows for N×N input/output switching.

Means to Solve the Problems

An optical switch in accordance with one aspect of the present invention, which includes a plurality of input ports and a plurality of output ports and having a planar waveguide type path switching function; characterised in that said optical switch comprises:

a plurality of sub-slab waveguides, having one ends connected to said input ports; and a common main slab waveguide having one end connected to opposite ends of said sub-slab waveguides via a plurality of array type optical waveguides; wherein said output ports are connected to an opposite end of said main slab optical waveguide; and wherein there is provided an electrode, in association with each of said array type optical waveguides, said electrode variably controlling a refractive index of each of said array type optical waveguides.

In the present invention, the main slab optical waveguide may have a planar shape such that an opposite side thereof connected to the output ports is of a narrow width and the one end connected to the array type optical waveguides is enlarged to an arc of a longer segment.

In an optical switch, according to the present invention, a heater electrode is arranged on the top of the arrayed optical waveguide, and difference in refractive indexes may be caused between neighboring optical waveguides in the arrayed optical waveguide under the thermo-optical effect brought about by heat generated by the heater electrode.

In an optical switch, according to the present invention, the arrayed optical waveguides may be formed of a material exhibiting electro-optical effects. A plural number of electrodes are arranged on the top of the arrayed optical waveguides, and the difference in the refractive indexes may be caused between neighboring optical waveguides in the arrayed optical waveguide under the electro-optical effect brought about by the electrical voltage applied to the electrode.

In the optical switch, the lengths of neighboring optical waveguides in said arrayed optical waveguide may be varied at a constant rate from one optical waveguide to the next.

Or, in the aforementioned optical switch, the lengths of neighboring optical waveguides in said arrayed optical waveguide may be made equal to one another.

In the aforementioned optical switch, the sub-slab optical waveguides, the main slab optical waveguide and the arrayed optical waveguides may monolithically be integrated on the same plane.

Or, in the aforementioned optical switch, at least the arrayed optical waveguides may be formed of a semiconductor material exhibiting electro-optical effects.

Or, in the aforementioned optical switch, at least the arrayed optical waveguides may be formed of a dielectric material exhibiting electro-optical effects.

In another aspect of the present invention, there is provided a method for path switching of an optical switch including a plural number of sub-slab optical waveguides, one ends of which are connected to a plural number of input ports, and a common main slab optical waveguide, one end of which is connected via a plural number of array type optical waveguides to the opposite side ends of the sub-slab optical waveguides. There are connected a plural number of output ports to the opposite side end of the main slab optical waveguide, while there are provided a plural number of control electrodes, in association with the array type optical waveguides, for variably controlling the refractive indexes of each of said optical waveguides. The method comprises a step of controlling the changes in the refractive index of the array type optical waveguide to vary a light collecting point on the main slab optical waveguide to perform switching of the output port.

The method according the present invention may comprise a step of propagating a light wave, supplied to an input port, on a sub-slab optical waveguide connected to the input port, and subsequently separately propagating the light wave to the arrayed optical waveguides, and a step of affording a preset difference between refractive indexes of respective neighboring optical waveguides in the array type optical waveguide by the control electrode to cause the equal phase plane of the light waves propagated on the array type optical waveguide to be tilted in accordance with the refractive index difference on an end face of the main slab optical waveguide which is a terminal end of the arrayed optical waveguides. The method also comprises a step of collecting the tilted light wave at an output port end provided on the end face of the main slab optical waveguide, in the course of propagation of the tilted light wave on the main slab optical waveguide, and outputting the collected light wave to outside of the optical switch via the output port.

SUMMARY AND OPERATION OF THE PRESENT INVENTION

With the optical switch, according to the present invention, path switching may be made from a plural number of inputs to a plural number of outputs. Moreover, switching between respective ports of the inputs and the outputs may be made simultaneously without interference between input and output light beams. A light wave supplied to a specified one of plural input ports is first propagated through a sub-slab optical waveguide, connected to the specified input port, and is then branched to one of the arrayed optical waveguides. In the arrayed optical waveguide, a control electrode, provided near-by, may afford a preset difference between the refractive indexes of optical waveguides neighboring in the form of an array. In this case, in the equal phase plane of the light wave which has propagated through the arrayed optical waveguide, may has a tilt in accordance with the refractive index difference on an end face of the main slab optical waveguide which is the terminal end of the arrayed optical waveguides. The light wave, the equal phase plane of which has been tilted as described above, are collected, in the course of propagation thereof on the main slab optical waveguide, at a specified output port end, provided at an end face of the main slab optical waveguide. The light wave so collected is output to outside the optical switch via the output port. The light collecting point on the main slab optical waveguide may be changed by properly controlling the refractive index change in the arrayed optical waveguide, whereby it becomes possible to perform switching of the output port. It is noted that no particular problem is raised in the selection of a light wave route (path), even in case where route (path) switching of plural ports is carried out simultaneously.

The optical switch according to the present invention may be constituted by a planar optical circuit making use of a quartz substrate. The substrate may be formed solely of quartz because the thermo-optical effect is used for changing the refractive index of the arrayed optical waveguide. High-speed path switching also becomes possible by making use of a semiconductor material or a dielectric material for the arrayed optical waveguides.

MERITORIOUS EFFECTS OF THE INVENTION

With the optical switch of the present invention, in which a plural number of the sub-slab optical waveguides, connected to a plural number of the input ports, are connected to a common main slab optical waveguide, it is possible to realize path switching of an N×N switch. It is noted that, with a path switching switch, making use of arrayed optical waveguides, the equal phase plane of the light waves propagated on the output side slab optical waveguide, is changed by controlling the refractive index of the arrayed optical waveguide which connects the two slab optical waveguides, to shift the light collecting point on the end face of the output side slab optical waveguide, thereby changing the output port. This gives a 1×N path switching switch. If N of these optical switches are juxtaposed, it is not possible to implement an N×N switch.

Moreover, with the optical switch of the present invention, the input optical waveguides, sub-slab optical waveguides, arrayed optical waveguides and the output optical waveguides may be monolithically integrated as a planar optical circuit on a sole substrate, thus reducing the circuit size and cost.

Additionally, with the optical switch of the present invention, the light wave, entering the plural input ports, may have path switching independently controlled by the arrayed optical waveguides. Since spatial switching may be carried out on the main slab optical waveguide, it is possible to effect switching of plural light wave paths simultaneously.

With the optical switch of the present invention, in which a semiconductor material or a dielectric material is used for the arrayed optical waveguide section, it becomes possible to exploit changes in the refractive index by the electro-optical effect, thereby achieving high-speed path switching.

Furthermore, with the optical switch, according to the present invention, it is possible to afford the wavelength routing function to the switch by varying the lengths of the optical waveguides of the arrayed optical waveguide section at a constant change rate.

According to the optical switch of the present invention, the end face of the main slab optical waveguide, connecting to the output optical waveguides, is reduced in width, while the side thereof connecting to the arrayed optical waveguide section is formed as an arc of a longer segment, thereby providing a fan-like planar configuration, thus contributing to reduction in the size of the N×N optical switch.

Figure 1:
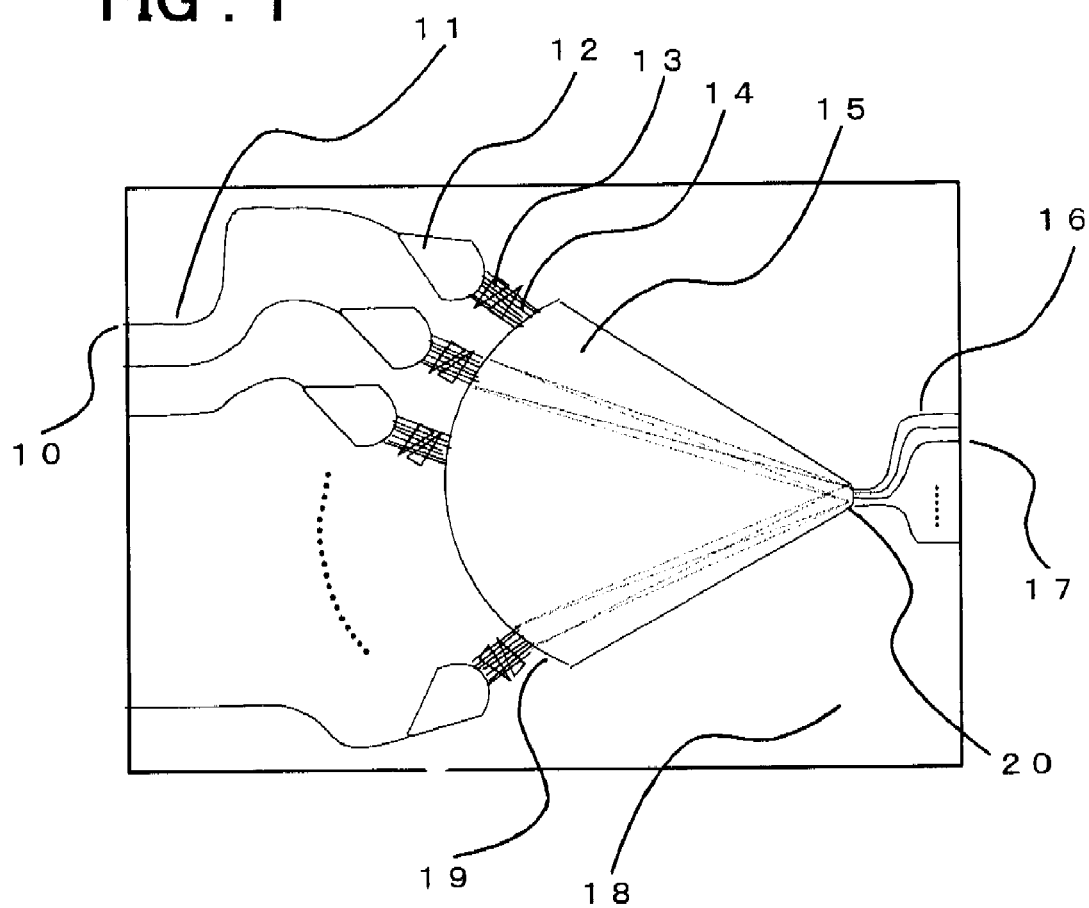
FIG. 1 is a schematic plan view showing an optical switch according to an embodiment of the present invention.

EXPLANATIONS OF SYMBOLS 10 input port
11 input waveguide
12 sub-slab optical waveguide
13 wedge-shaped heater control electrode
14 arrayed optical waveguide
15 main slab optical waveguide
16 output optical waveguide
17 output port
18 quartz substrate
19 input end of the main slab optical waveguide
20 output end of the main slab optical waveguide
30 input port
31 input waveguide
32 sub-slab optical waveguide
33 wedge-shaped control electrode
34 arrayed semiconductor optical waveguide 35 main slab optical waveguide
36 output optical waveguide
37 output port
38 quartz substrate
39 input end to the main slab optical waveguide
40 output end to the main slab optical waveguide
41 ground electrode
42 arrayed semiconductor optical waveguide section
50 wedge-shaped electrodes
52 second clad layer of a quartz waveguide
53 second clad layer of a quartz waveguide
54 core layer of a quartz waveguide
55 grounding electrode
56 n-type InP substrate
57 InP optical waveguide array
58 p-type InP clad layer
59 n-type InP clad layer
60 InGaAsP/InP multiple quantum well core layer
71 quartz substrate
72 second slab optical waveguide
73 output optical waveguide
74 input optical waveguide
75 first slab optical waveguide
76 heater electrode
77 arrayed optical waveguide
78 output end of second slab optical waveguide
79 input end of second slab optical waveguide

BEST MODE FOR CARRYING OUT THE INVENTION

Preferred embodiments of the present invention will now be described in detail with reference to the accompanying drawings. FIG. 1 schematically shows a configuration of an embodiment of an optical switch according to the present invention. Referring to FIG. 1, the optical switch embodying the present invention includes a quartz substrate 18 on which there are provided a plural number of input waveguides 11 and a plural number of sub-slab optical waveguides 12. The sub-slab optical waveguides 12 and a main slab optical waveguide 15 are optically interconnected by a plural number of arrayed optical waveguides 14. Meanwhile, the sub-slab optical waveguides and the main slab optical waveguide are sometimes abbreviated to the sub-slab waveguides and to the main slab waveguide, respectively. On the top of each set of arrayed optical waveguides 14, there is provided a wedge-shaped heater control electrode 13. The sub-slab optical waveguides are all optically coupled to one end 19 of the common main slab optical waveguide 15. To an opposite end 20 of the main slab optical waveguide 15 are optically coupled a plural number of output optical waveguides 16. The planar configuration of the main slab optical waveguide 15 is such that it has a narrow side connecting to the plural output optical waveguides 16 and a broader side connecting to the plural arrayed optical waveguides 14. The intervals between the neighboring optical waveguides 16 are narrowed down. In the embodiment of FIG. 1, the side of the main slab optical waveguide 15 connecting to the plural arrayed optical waveguides 14 is arcuately enlarged such as to give the main slab optical waveguide a fan-like planar profile. The intervals between neighboring output optical waveguides 16 on the end face side of the main slab optical waveguide 15 with the narrow width, towards the knot of the fan shape, are selected to be smaller in keeping with the narrow end of the main slab optical waveguide 15. Part or all of the output optical waveguides 16 are first extended linearly from the sides thereof connecting to the main slab optical waveguide 15. The output optical waveguides 16 are then spread apart for opening at a preset angle relative to the direction of the linear extension, and are further extended parallel to the direction of the linear extension to get to one of output ports 17. The intervals between neighboring output ports are selected to be larger than the intervals between neighboring output optical waveguides 16 at the end face of narrow width of the main slab optical waveguide 15. This substantially fan-shaped main slab optical waveguide 15 contributes to size reduction of the N×N optical switch. The operation and the function of the embodiment described above will now be described in detail.

The light of an input light wave signal, supplied to one of the input ports 10, is branched to an associated one of the arrayed optical waveguides 14, each of which includes a plurality of optical waveguides arranged in a form of an array, via an associated one of the sub-slab optical waveguides 12. The light gets to one end (input end 19) of the main slab optical waveguide 15 so as to be propagated within the main slab optical waveguide 15. The light then is collected at a specified one of the output ports of the opposite side end (output end) 20 of the main slab optical waveguide 15 and propagated on the output optical waveguides 16 so as to be output at the specified output port 17.

The power supplied to the wedge-shaped heater control electrode 13, provided on the top of the arrayed optical waveguide 14, may be varied to afford a preset difference in the refractive indexes of respective optical waveguides in the arrayed optical waveguide 14, under the thermo-optical effect. This enables the normal line direction of the equal phase plane of the light wave signal at the one end (input end) 19 of the main slab optical waveguide 15 to be changed to render it possible to vary the light collecting position at the output end 20 of the main slab optical waveguide 15. That is, the output ports 19 may optionally be changed over by setting the light collecting position to a desired one of the output optical waveguides 16 provided at the output end of the main slab optical waveguide 15.

The sub-slab optical waveguides 12 connected to the input ports 10, and the arrayed optical waveguides 14, are independent of one another, so that the operations of the sub-slab optical waveguides 12 or the arrayed optical waveguides 14 do not affect one another, with the result that plural optical paths may be switched simultaneously.

Figure 2:
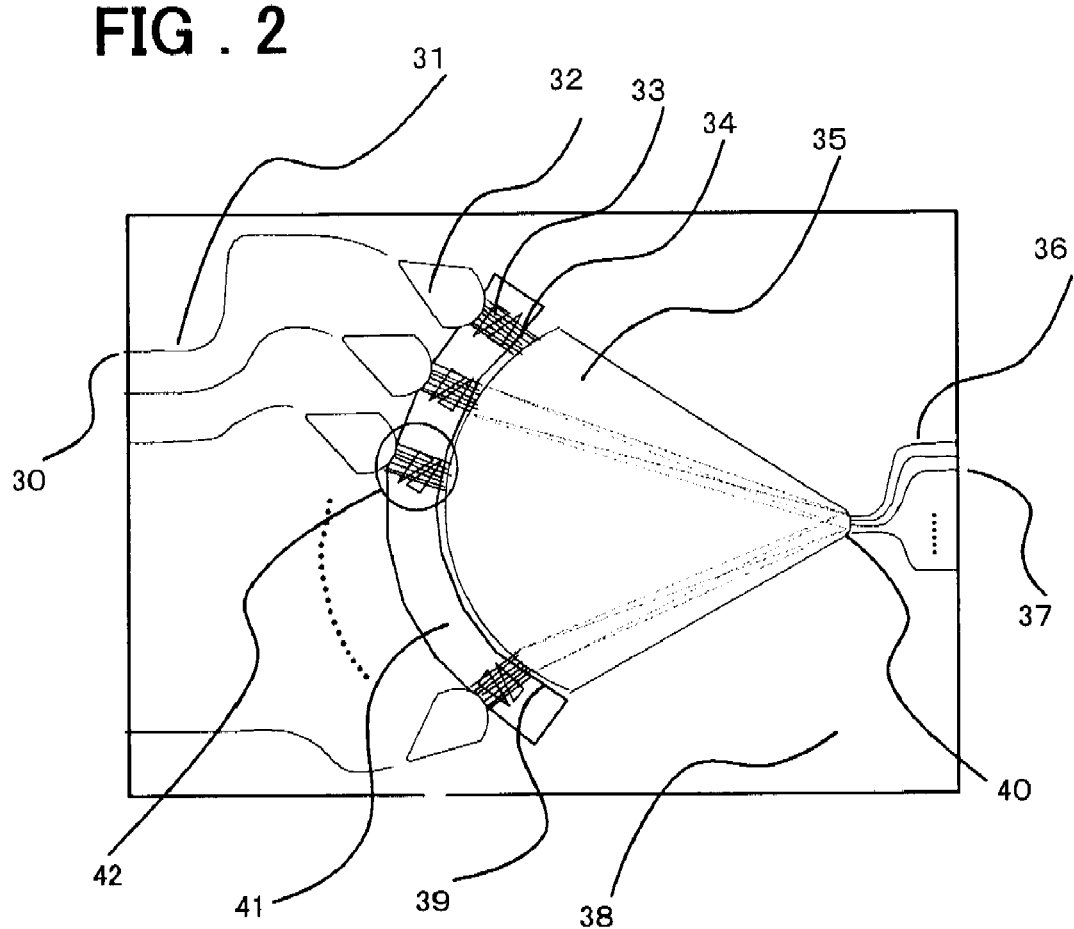
FIG. 2 is a schematic plan view showing an optical switch according to another embodiment of the present invention.

An optical switch, which uses semiconductor optical waveguides in the arrayed optical waveguide section 14 to enable in particular a high-speed path switching operation, will now be described as another embodiment of the present invention. FIG. 2 schematically shows the configuration of an optical switch of the present invention which in particular provides for a high-speed operation.

FIG. 2 shows an optical switch of the present modification which includes a quartz substrate 38, to which are connected a plural number of input waveguides 31 and a plural number of sub-slab optical waveguides 32. The sub-slab optical waveguides 32 and a main slab optical waveguide 35 are optically interconnected by a plural number of sets each composed of arrayed semiconductor optical waveguides 34. On the top of each set composed of arrayed optical waveguides 34, there is provided a pair of wedge-shaped heater control electrodes 13 for applying the electrical voltage to the paths 34. All of the sub-slab optical waveguides 32 are optically coupled to one end (input end) 39 of the common main slab optical waveguide 35. A plural number of output optical waveguides 36 are optically coupled to one end (output end) 40 of the main slab optical waveguide 35. A grounding electrode 41 is connected to the bottom side of each of the arrayed optical waveguides 34.

Figure 3:
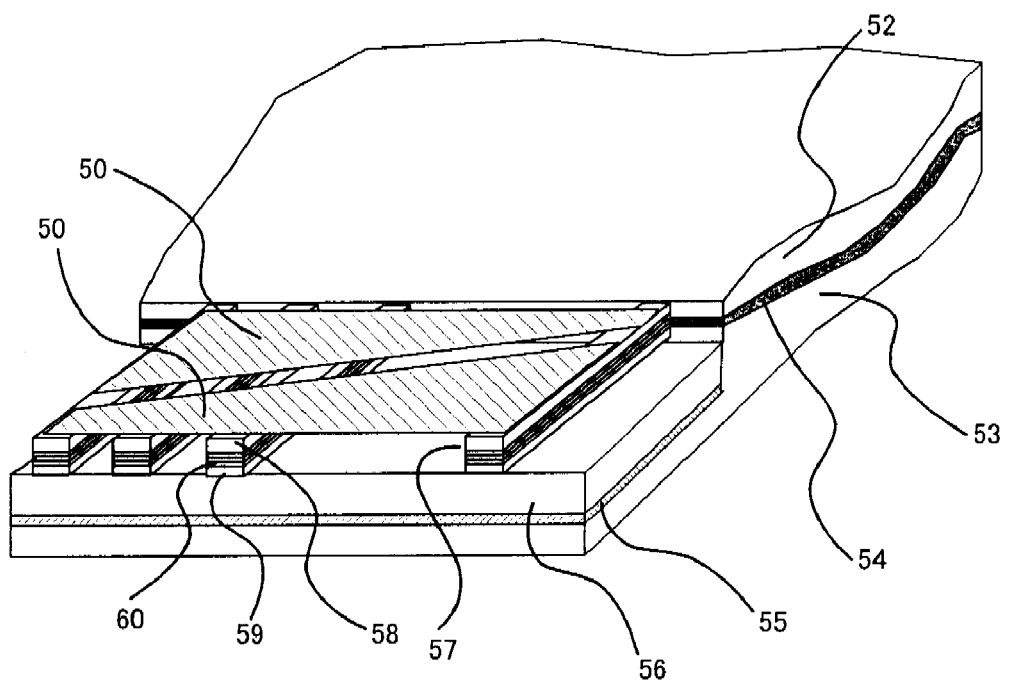
FIG. 3 is a partially enlarged perspective view showing an arrayed semiconductor optical waveguide section for light integration as shown in FIG. 2.
Figure 4:
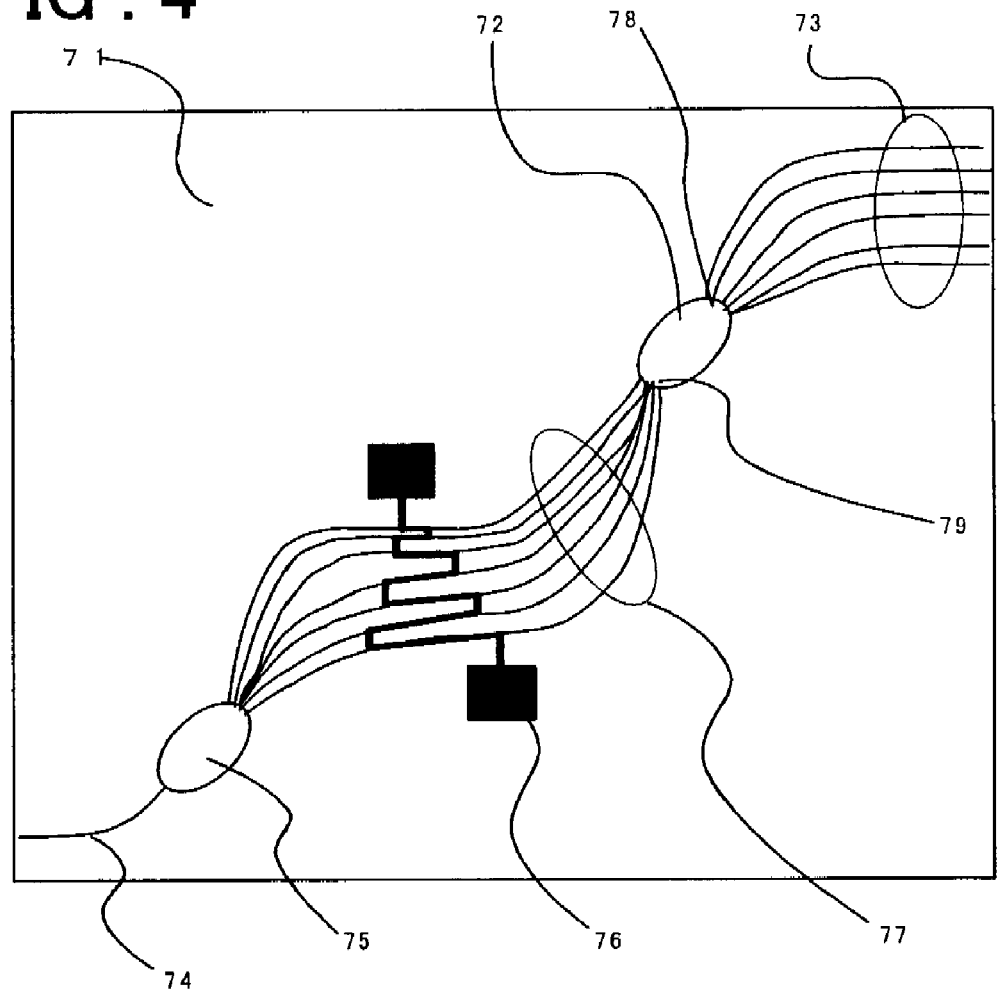
FIG. 4 is a schematic plan view showing a conventional optical switch employing an arrayed optical waveguide.

FIG. 3 depicts an enlarged perspective view showing a portion of the arrayed semiconductor optical waveguide section 42 shown in FIG. 2. In FIG. 3, a grounding electrode 55 is provided on the top of a portion of a first clad layer 53 of the quartz waveguide which has been exposed by partially cutting off the quartz waveguide. The arrayed semiconductor optical waveguide section is provided on the top of the grounding electrode 55.

The arrayed semiconductor optical waveguide comprises a multiple-quantum well type core layer 60 and a p-InP clad layer 58, arranged in this order on a p-type InP substrate 56. The multiple-quantum well type core layer is made up of an n-type InP clad layer 59 and InGaAsP/InP. A pair of wedge-shaped electrodes 50 is provided as the uppermost surface. The center height along the stack-up direction of the multiple-quantum well type core layer 60 is selected to be equal to that of the core layer 54 of the quartz waveguide.

When the electrical voltage is applied across the wedge-shaped electrodes 50 and the grounding electrode 55, an electrical field is applied to the multiple-quantum well type core layer 60, thus causing changes in the refractive index of the multiple-quantum well type core layers 60 by the quantum confinement Stark effect (QCSE). Since the lengths of the electrodes on the arrayed optical waveguide exhibit a preset difference, due to the wedge shape, there is caused a preset difference in the effective refractive indexes of the arrayed optical waveguide.

The quantum confinement Stark effect (QCSE), demonstrated on the multiple-quantum well type core layer 60, represents a physical phenomenon exhibiting high-speed characteristics, allowing for nanosecond order path switching.

Although the present invention has so far been described with reference to preferred embodiments, the present invention is not to be restricted to the embodiments. It is to be appreciated that those skilled in the art can change or modify the embodiments without departing from the scope and spirit of the invention.

The invention claimed is:

1. An optical switch comprising:
  a plurality of sub-slab waveguides, each comprising an input end connected to one of a plurality of input ports and an output end, connected to one of a plurality of optical waveguide arrays;
  a common main slab waveguide comprising an input end connected to the output ends of the sub-slab waveguides via the plurality of optical waveguide arrays, and an output end connected to output ports;
  at least one common electrode associated with two or more of the plurality of optical waveguide arrays; and
  a plurality of control electrodes, each provided in association with one of the plurality of optical waveguide arrays;
  wherein a refractive index of each of the plurality of optical waveguide arrays is variably controlled by the at least one common electrode and at least one of the plurality of control electrodes.

2. The optical switch according to claim 1, wherein the at least one common electrode is disposed on the top of the plurality of optical waveguide arrays.

3. The optical switch according to claim 1,
  wherein the main slab optical waveguide has a planar shape profile, and wherein a width of the output end of the main slab optical waveguide is narrower than a width of the input end of the main slab optical waveguide.

4. The optical switch according to claim 1, wherein the main slab optical waveguide has a fan-shaped planar profile, wherein the input end of the main slab optical waveguide has an accurate shape and a width narrower than a width of the output end of the main slab optical waveguide.

5. An optical switch comprising:
a plurality of fan-shaped sub-slab waveguides each comprising an input end thereof connected to one of a plurality of input optical waveguides spaced apart from one another;
a plurality of optical waveguide arrays, each having input ends connected to an output end of one said plurality of sub-slab optical waveguides, respectively;
a main fan-shaped slab waveguide comprising an input side connected to output ends of the plurality of optical waveguide arrays, and an output side, wherein said input side is broader than said output side;
a plurality of output optical waveguides each comprising an input end connected to the output side of said main slab optical waveguide, said output optical waveguides being spaced apart from one another; and
a plurality of electrodes provided in association with said plurality of optical waveguide arrays, said electrodes variably controlling the refractive indexes of said optical waveguide arrays.

6. An optical switch comprising:
a plurality of sub-slab waveguides having input ends thereof connected to a plurality of input optical waveguides spaced apart from one another;
a plurality of optical waveguide arrays having input ends connected to output sides of said sub-slab optical waveguides;
a main slab waveguide provided in common to said plurality of optical waveguide arrays, said main slab waveguide having an input side connected to output ends of said plurality of optical waveguide arrays and an output side, wherein said input side is broader than said output side;
a plurality of output optical waveguides connected to an output side of said main slab optical waveguide, said output optical waveguides being spaced apart from one another; and
a plurality of electrodes provided in association with of said plurality of optical waveguide arrays, said electrodes variably controlling the refractive indexes of said optical waveguide arrays,
wherein
input ends of said input optical waveguides comprise input ports, each receiving an incident light;
output ends of said output optical waveguides comprise output ports, each emitting a light; and
at least one of said output optical waveguides extends linearly from said output side of said main slab waveguide, then bends before reaching an output port; such that an interval between ends of said output optical waveguides at said main slab waveguide is smaller than an interval between said output optical waveguides at said output ports.

7. The optical switch according to claim 1, wherein the plurality of optical waveguide arrays are formed of a material exhibiting an electro-optical effect;
wherein at least one common electrode is disposed on the top of the plurality of optical waveguide arrays; and wherein a difference between the refractive indexes of neighboring optical waveguides in the plurality of optical waveguide is caused by an electro-optical effect brought about by a voltage application to the at least one common electrode.

8. The optical switch according to claim 1, wherein lengths of neighboring optical waveguides in the plurality of optical wave guide arrays vary at a constant rate from one neighboring optical waveguide to a next optical waveguide.

9. The optical switch according to claim 1, wherein lengths of neighboring optical waveguides in the plurality of optical waveguide arrays are equal.

10. The optical switch according to claim 1, wherein the plurality of sub-slab waveguides, the common main slab optical waveguide and the plurality of optical waveguide arrays are monolithically integrated on a single plane.

11. The optical switch according to claim 1, wherein the plurality of optical waveguide arrays are formed of a semiconductor material having an electro-optical effect.

12. The optical switch according to claim 1, wherein the plurality of optical waveguide arrays are formed of a dielectric material having an electro-optical effect.

13. The optical switch according to claim 1, wherein the at least one common electrode and the plurality of control electrodes control the refractive index of the plurality of optical waveguide arrays and thus vary a light collecting point on the main slab optical waveguide to perform switching of the output port.

14. The optical switch according to claim 1,
wherein the at least one common electrode and the plurality of control electrodes control a predetermined difference in refractive indexes of neighboring optical waveguides in the plurality of optical waveguide arrays;
wherein an equal phase plane of light propagated in the plurality of the optical waveguide arrays is tilted in accordance with the predeterimed difference such that the light is incident on a region of the output port of the main slab optical waveguide, and is directed to one of the plurality of output ports.

15. A method of path switching an optical switch, the optical switch comprising a plurality of sub-slab optical waveguides having input ends connected to a plurality of input ports; a common main slab optical waveguide, having an input side connected via a plurality of optical waveguide arrays to output ends of the sub-slab optical waveguides, and an output side connected to a plurality of output ports:
variably controlling a change in a refractive index of one or more of the plurality of optical waveguide arrays by applying a voltage between at least one common electrode associated with two or more of the plurality of optical waveguide arrays and one or more of a plurality of control electrodes associated with the one or more of the plurality of optical waveguide arrays, thus varying a light collecting point on said main slab waveguide to perform switching of the output port.

16. The method for path switching of an optical switch according to claim 15, further comprising:
propagating a light wave, supplied to an input port, on one of a plurality of sub-slab optical waveguides connected to said input port, and subsequently branching the light wave to one of the plurality of optical waveguide arrays;
presetting a difference between refractive indexes of neighboring optical waveguides in the plurality of optical waveguide arrays by applying a voltage between the at least one common electrode and the plurality of control electrodes thus causing an equal phase plane of light propagated in the plurality of optical waveguide arrays to be tilted in accordance with the refractive index difference such that the light is incident on a portion of the input end of the main slab optical waveguide and is guided to one or more of the output ports.

17. The optical switch according to claim 1, wherein said plurality of sub-slab waveguides are disposed on a quartz substrate.

* * * * *